US012225637B1

(12) United States Patent
Yang

(10) Patent No.: US 12,225,637 B1
(45) Date of Patent: Feb. 11, 2025

(54) CURVED SURFACE HEATING DEVICE AND METHOD FOR FORMING THREE-DIMENSIONAL PATTERNS

(71) Applicant: OPAS TECHNOLOGY CO., LTD., New Taipei (TW)

(72) Inventor: Chun-Hua Yang, New Taipei (TW)

(73) Assignee: OPAS TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/610,726

(22) Filed: Mar. 20, 2024

(51) Int. Cl.
*H05B 3/22* (2006.01)
*H05B 3/84* (2006.01)

(52) U.S. Cl.
CPC ................. *H05B 3/22* (2013.01); *H05B 3/84* (2013.01)

(58) Field of Classification Search
CPC ...... H05B 3/20; H05B 3/22; H05B 3/26–267; H05B 3/28–286; H05B 3/68; H05B 3/74; H05B 3/742; H05B 3/10; H05B 3/12; H05B 3/141; H05B 3/145; H05B 3/16; H05B 3/18; H05B 3/84; H05B 3/845; H05B 3/86; H05B 2214/00; H05B 2214/02
USPC ........................................................ 219/552
See application file for complete search history.

(56) References Cited

U.S. PATENT DOCUMENTS 5,070,230 A * 12/1991 Osada ............... B32B 17/10174 219/547
5,099,104 A * 3/1992 Holzer .............. B32B 17/10036 219/203
5,250,228 A * 10/1993 Baigrie .................. H01C 7/027 219/547
2008/0269378 A1* 10/2008 Saga ........................ C08K 3/08 524/502
2012/0085745 A1* 4/2012 Brattoli ................... A47J 39/02 206/557
2020/0307122 A1* 10/2020 Janssen ................... B29C 70/16

* cited by examiner

*Primary Examiner* — Sang Y Paik
(74) *Attorney, Agent, or Firm* — Best & Flanagan LLP

(57) ABSTRACT

A curved surface heating device comprising a curved panel-shaped protective layer, with a conductive layer formed on one side of the protective layer, wherein the conductive layer comprises a conductive metal or a carbon-based material, wherein a volume percentage of the conductive metal is between 30% and 60% and a volume percentage of the carbon-based material is between 30% and 60%, and wherein a thickness of the conductive layer is within 50 micrometers (μm).

17 Claims, 10 Drawing Sheets

CURVED SURFACE HEATING DEVICE AND METHOD FOR FORMING THREE-DIMENSIONAL PATTERNS

FIELD OF INVENTION

Heating device and method for manufacturing the same, in particular a curved surface heating device and a method for forming three-dimensional patterns.

BACKGROUND OF THE INVENTION

Conventional lamp shells on the market are typically processed using screen printing technology to form functional structures, such as a conductive layer, an insulating circuit, etc., on a component to achieve the effect of conducting light and/or generating heat when the lamp shell is conductive. However, screen printing technology is more suitable for the components without curvature. When processing the components with larger curvatures and using this screen printing technology, the functional structures printed on the components may experience unstable quality, causing the functional structures to fail to achieve their original effects, especially for patterns that cannot tolerate breakage or unevenness, such as a conductive pattern used for heating, which, if the conductive pattern experiences breakage or unevenness, may result in a discontinuous circuit that fails to achieve the original conductive effect.

In view of this, relevant industries are actively developing methods and technologies that can be applied to the components with curvature, as well as practical applications of this technology of manufacturing related products.

SUMMARY OF THE INVENTION

To address the issues mentioned in the prior art, the present invention provides a curved surface heating device comprising a protective layer, which is a curved panel shape and has dielectric properties; and a conductive layer is formed on one side of the protective layer and has transparency and electrothermal properties, with a resistance value within 3002 and a current withstand value of less than 20 A. The conductive layer comprises a high-conductivity material, including a conductive metal or a carbon-based material, wherein a volume percentage of the conductive metal in the high-conductivity material is between 30% and 60%, and a volume percentage of the carbon-based material in the high-conductivity material is between 30% and 60%. A thickness of the conductive layer is within 50 micrometers (μm).

The present invention also provides a method for forming three-dimensional patterns, including steps of: preparing a protective layer, which is a curved surface structure, and a carrier, wherein the curved surface structure of the protective layer corresponds to the shape of the carrier; placing the conductive layer on an upper surface of a base; applying pressure to the carrier toward the upper surface so that the carrier covers the conductive layer and at least a portion of the carrier contacts the upper surface of the base; attaching the conductive layer to the carrier, which is formed in a shape corresponding to the curved surface structure; and positioning the corresponding shape of the conductive layer with the carrier against the protective layer and leaving the conductive layer on one side of the protective layer.

The curved surface heating device can be heated by electrical conduction to maintain a fixed temperature range, thereby producing temperature control and insulation effects. Meanwhile, since the curved surface heating device is manufactured using a flexible 3D pattern element forming method, the curved surface heating device can be applied to curved shells or components with curved shapes. The curved surface heating device has a wide range of applications and can be used to produce parts for vehicles, lamp covers, traffic signals, lenses, goggles, signal sensors, display panels, mirrors, and other daily necessities.

DETAILED DESCRIPTION OF THE PREFERRED EMBODIMENTS

The present invention aims to provide a curved surface heating device and a manufacturing method thereof, which can be used for curved shells or curved shapes, through a flexible 3D pattern element forming method to process functional circuits or patterns, such as conductive circuits or insulating circuits, onto curved shells or curved shapes to solve the problem of damaging functional circuits or patterns that may occur during processing of conventional screen printing.

Figure 1:
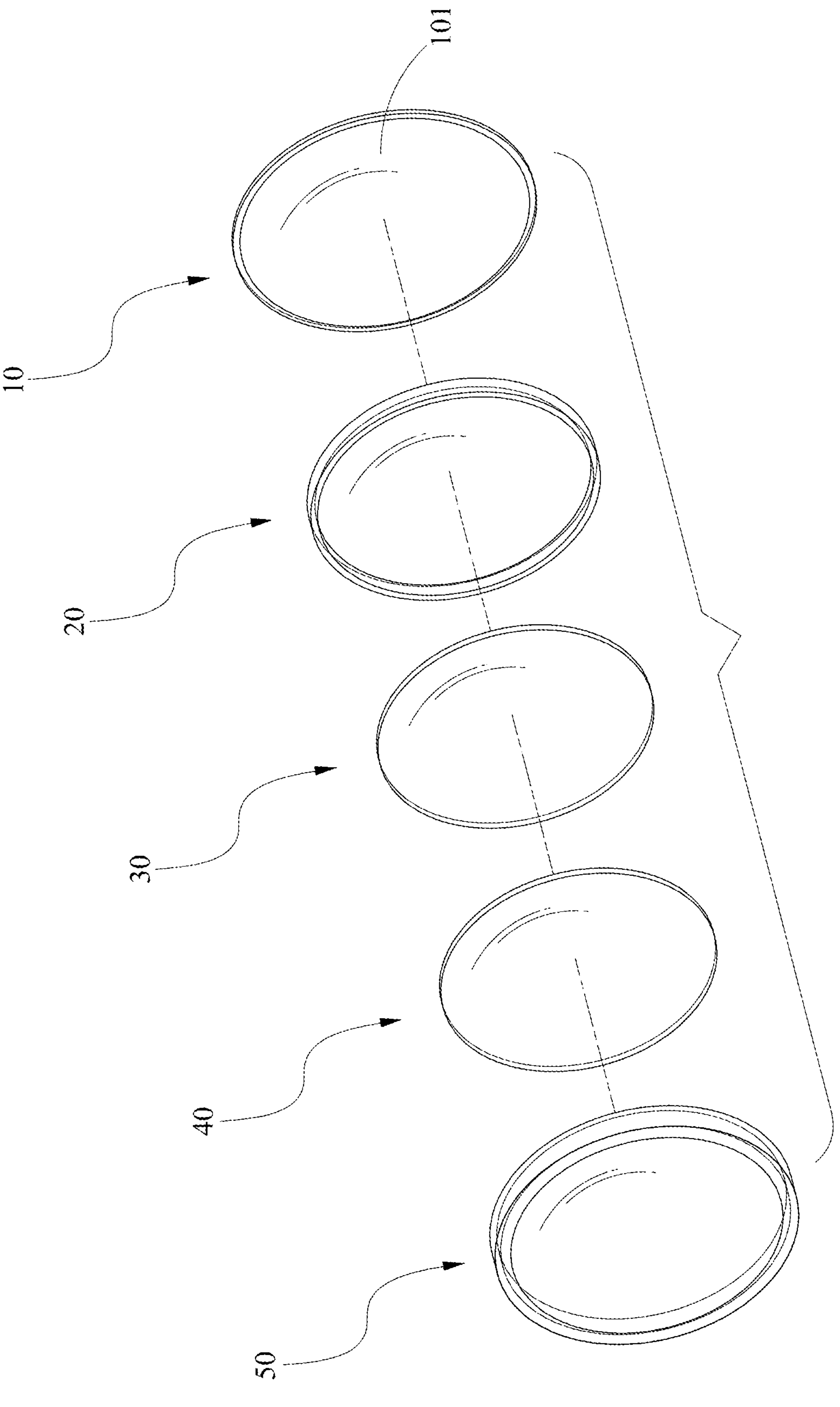
FIG. 1 is an exploded view of a first preferred embodiment of the present invention.

In order to better understand the technical features and practical effects of the present invention and to implement the present invention in accordance with the contents of the specification, further detailed descriptions will be provided below with reference to a first preferred embodiment as shown in FIG. 1.

"Curved Surface Heating Device"

FIG. 1 shows the first preferred embodiment of the curved surface heating device provided by the present invention. The curved surface heating device includes sequentially stacked layers of a protective layer 10, a bonding layer 20, a conductive layer 30, a temperature control insulation layer 40, and an insulation layer 50. The curved surface heating device can be heated by electrical conduction to maintain a fixed temperature range, thereby producing temperature control and insulation effects. At the same time, since the curved surface heating device is manufactured using the flexible 3D pattern element forming method, the curved surface heating device can be applied to curved shells or components having curved shapes. In addition, the curved surface heating device has a wide range of applications and can be used to produce parts for transportation vehicles, lamp covers, traffic signals, lenses, goggles, signal sensors, display panels, mirrors, and other daily necessities.

Figure 2:
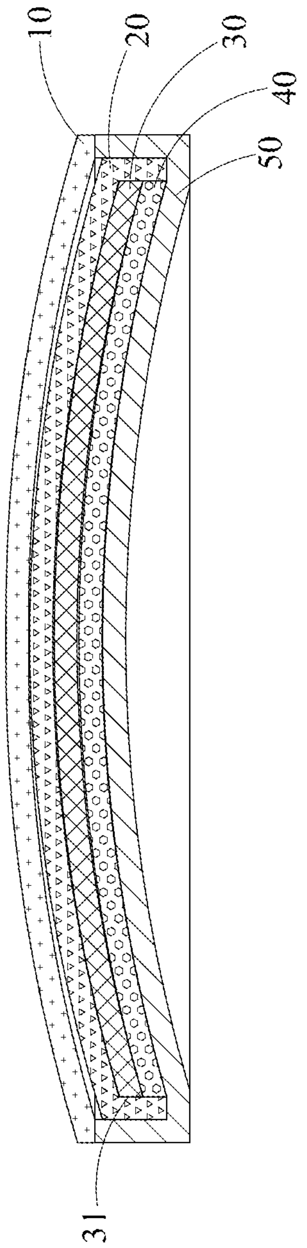
FIG. 2 is a sectional view of the first preferred embodiment of the present invention.

Referring to FIGS. 1 and 2. The protective layer 10 is a transparent material with dielectric properties and is curved in shape. During manufacturing, the protective layer 10 can be formed into a curved shape by processing a plastic base material with a flat panel shape. The processing conditions may involve applying heat and an external force to soften the protective layer 10 and deform the protective layer 10 along a force point corresponding to the external force, thereby transforming the protective layer 10 from original flat panel shape to curved panel shape with convex and concave directions. Importantly, the protective layer 10 maintains its curved panel shape even after the external force is removed.

Wherein, the protective layer 10 can be made of plastic or glass; preferably, the protective layer 10 is made of materials such as polycarbonate (PC), polypropylene (PP), or polyethylene (PE).

Wherein, the bonding layer 20, the conductive layer 30, the temperature control insulation layer 40, and the insulation layer 50 are formed on one side of the protective layer 10. In this embodiment, the bonding layer 20, the conductive layer 30, the temperature control insulation layer 40, and the insulation layer 50 are formed on a concave surface 101 of the protective layer 10. Subsequently, the concave surface 101 will be used as an embodiment for description.

The bonding layer 20 is formed by curing a transparent adhesive and is used to tightly bond to the protective layer 10, the conductive layer 30, and/or the temperature control insulation layer 40. The bonding layer 20 also has dielectric and flexibility properties, and the material is preferably an optical clear adhesive. The form of the bonding layer 20 is not limited and can be selected based on the material of the protective layer 10, such as whether the bonding layer 20 is a thin film or a liquid adhesive. The bonding layer 20 can be processed onto the protective layer 10 by methods such as coating, pad printing, reprinting, transfer printing, in-mold printing, 3D printing, inkjet printing, gravure printing, etc.

In this embodiment, the bonding layer 20 is in a fluid state when adhered to the conductive layer 30, and the total area of the bonding layer 20 is slightly larger than that of the conductive layer 30 and/or the temperature control insulation layer 40.

The conductive layer 30 is a layer having electrothermal properties and can be a thin film or can be formed by curing the liquid adhesive. The conductive layer 30 can generate heat when input current to make the curved surface heating device has a defrosting, defogging, and/or demisting effect. Preferably, a resistance value of the conductive layer 30 is within 300Ω and a current withstand value is less than 2 A. The conductive layer 30 may be a conductive adhesive, which is the liquid adhesive having electrothermal properties, and may be opaque or transparent.

Preferably, the conductive adhesive can be a gel formed by mixing high-conductivity materials such as conductive metals or carbon-based materials with resin solvents. Wherein, a volume percentage of the conductive metal in the high-conductivity material is between 30% and 60%, and a volume percentage of the carbon-based material in the high-conductivity material is between 30% and 60%. The conductive metal and/or the carbon-based material may be granular, flaky, or in the form of short fibers. It should be noted that when the conductive metal is flaky, it not only contributes to the conductivity of the conductive adhesive, but also increases the overall structural strength after the conductive adhesive is cured.

Furthermore, the conductive metal is preferably silver, copper, gold, aluminum, and the carbon-based material may preferably include carbon nanotubes, carbon fibers, or modified compounds of the above materials.

Figure 9:
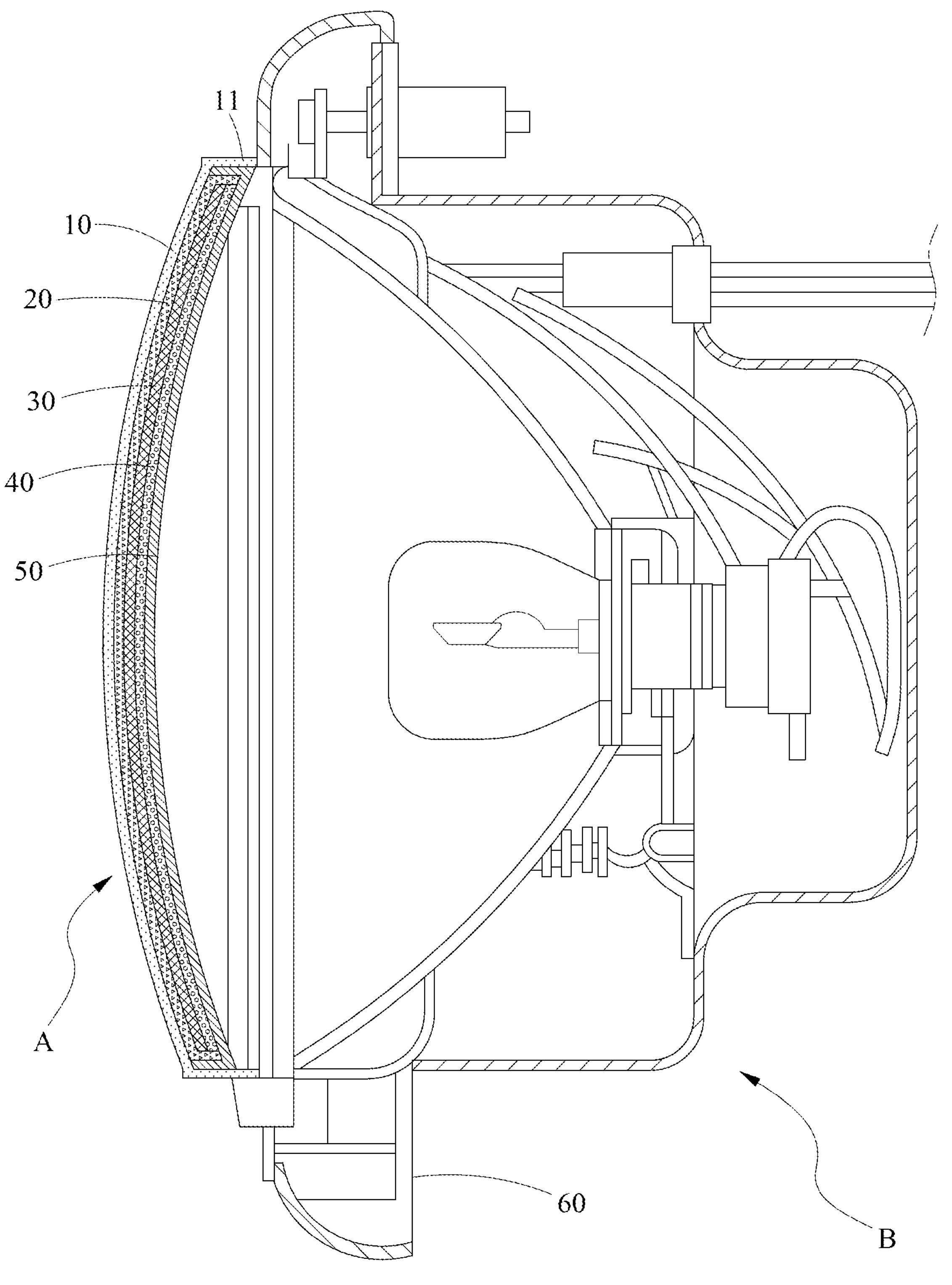
FIG. 9 is a sectional view of a fourth preferred embodiment of the present invention in use.

It should be noted that due to the properties of the material, the conductive layer 30 can be presented in a transparent or opaque form. For example, when the curved surface heating device is applied in the form of a vehicle lamp shell A as shown in FIG. 9, the conductive layer 30 can choose the liquid adhesive or the thin film with transparency so that when a user activates the vehicle lamp component B, light from the inside of the vehicle lamp component B can pass through the vehicle lamp shell A, reducing the attenuation of the light when passing through the vehicle lamp shell A, thereby increasing the safety of the user when using the vehicle lamp component B. When the conductive layer 30 is made of the liquid adhesive or the film with transparency, the transmittance of the conductive layer 30 is preferably over 80%.

Wherein, the conductive layer 30 is distributed on the bonding layer 20 using the flexible 3D pattern element forming method provided by the present invention. Furthermore, through the flexible 3D pattern element forming method, the conductive layer 30 can be further stacked with the conductive adhesive continuously to increase the thickness of the conductive layer 30. Preferably, a thickness of the conductive layer 30 is within 50 micrometers (μm).

Furthermore, the curved surface heating device is electrically connected to a power supply device via the conductive layer 30. Due to the material properties of the conductive layer 30 mentioned above, the conductive layer 30 can generate electrothermal properties after receiving electricity. The power supply device can be presented in the form of a battery or connected to a wall outlet. Preferably, the power supply device can provide power in the form of alternating current or direct current.

Wherein, the use of the bonding layer 20 can be determined based on the material selection of the conductive layer 30. For example, if the conductive layer 30 is made of the conductive metal, which results in a lower adhesion of the conductive layer 30, in that case, the bonding layer 20 can be coated on one side of the protective layer 10 before the conductive layer is placed to strengthen the bond between the conductive layer 30 and the protective layer 10.

Furthermore, the conductive layer 30 may also be mixed with the adhesive of the bonding layer 20 prior to being placed on one side of the protective layer 10.

It should be noted that when the bonding layer 20 is the liquid adhesive, during the setting of the conductive layer 30 using the flexible 3D pattern element forming method, due to the flowability of the bonding layer 20, at least a portion of the bonding layer 20 comes into contact with a lateral surface 31 of the conductive layer 30 in the thickness direction, which helps to bond the conductive layer 30 to the protective layer 10. Furthermore, when the bonding layer 20 abuts the conductive layer 30, pressure causes the bonding layer 20 to fluidly envelope the entire thickness of the lateral surface 31 of the conductive layer 30, causing the bonding layer 20 and the conductive layer 30 to form a plane together, thereby overcoming the problem of the difficulty in placing the conductive layer 30 within the curved surface heating device due to the thickness of the conductive layer 30.

Furthermore, it is optional to place the temperature control insulation layer 40 on one side of the conductive layer 30, i.e., the temperature control insulation layer 40 can be added before or after the conductive layer 30 is placed.

The temperature control insulation layer 40 is cured of a carbon-containing adhesive and has a thermal insulation effect that can maintain the overall temperature of the lamp component B (including the temperature generated by the conductive layer 30) within a specific range to prevent the temperature of the lamp component B from continuously rising and damaging the lamp component B, thereby achieving the temperature control and insulation effects. Wherein the temperature range is from 30° C. to 100° C. The carbon-containing adhesive may contain carbon-based materials, and the carbon-based materials include graphite or carbon nanotubes.

Figure 6:
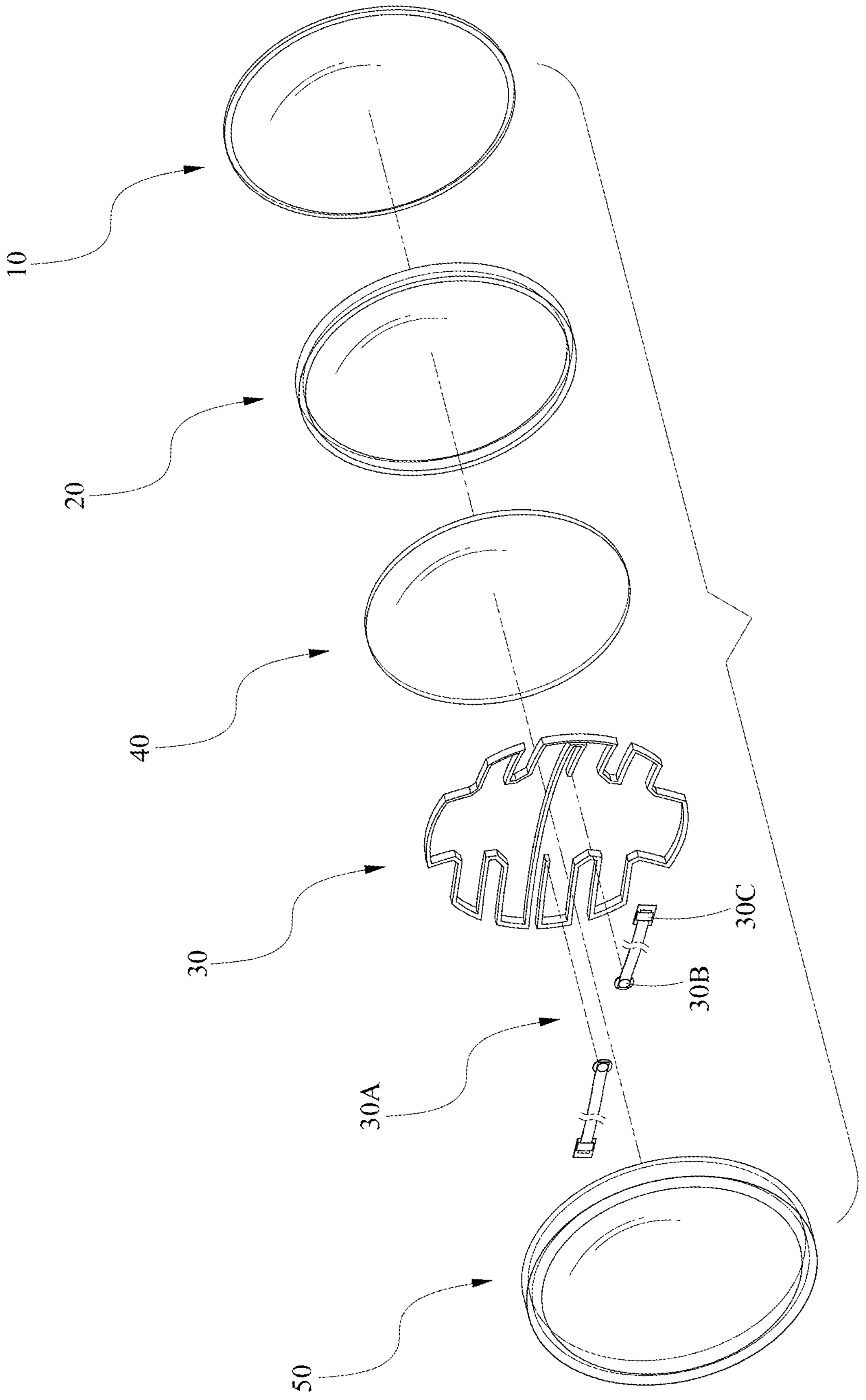
FIG. 6 is a perspective view of a third preferred embodiment of the present invention.
Figure 7:
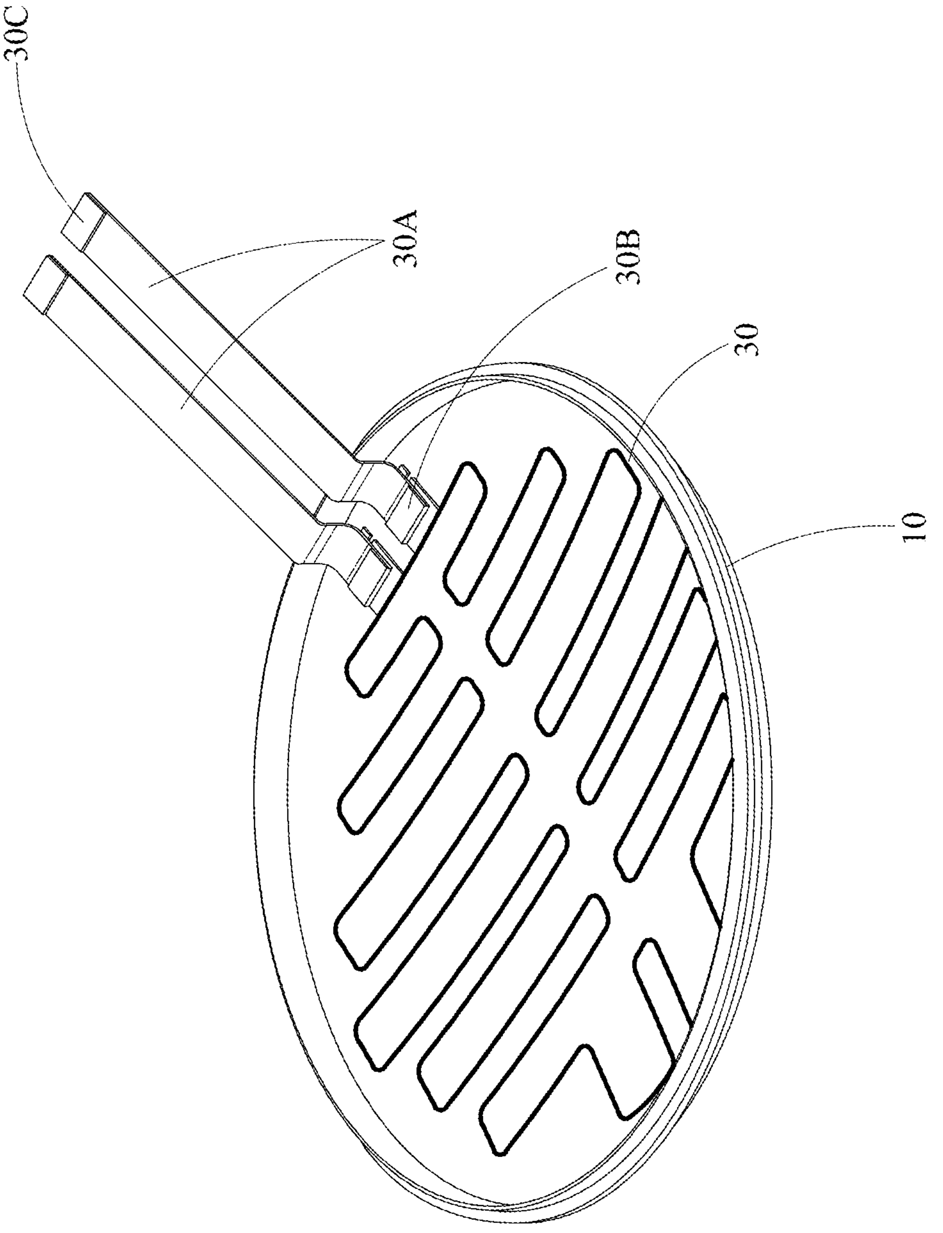
FIG. 7 is a first perspective view of the third preferred embodiment of the present invention in use.
Figure 8:
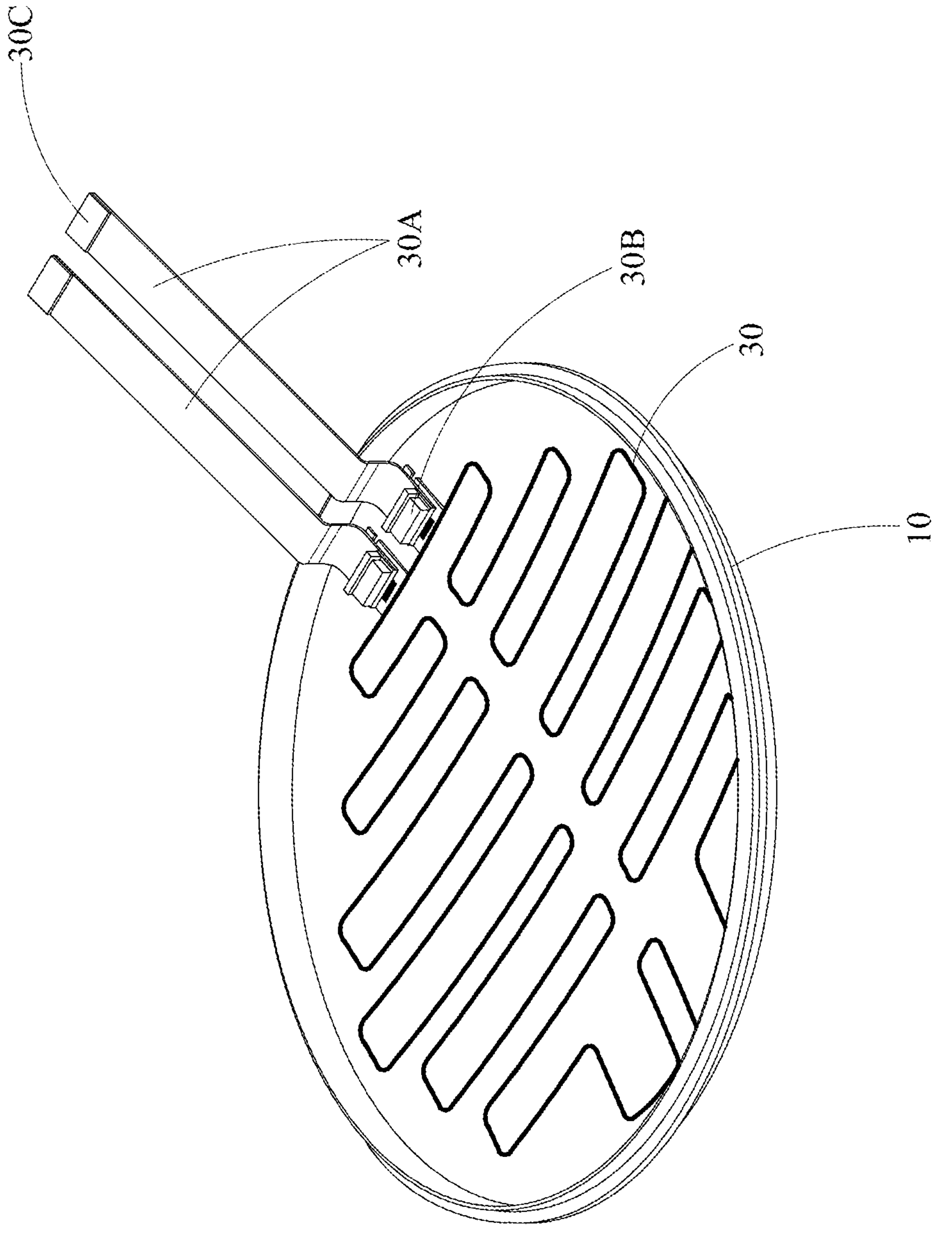
FIG. 8 is a second perspective view of the third preferred embodiment of the present invention in use.

Preferably, with reference to FIGS. 6 and 7, the temperature control insulation layer 40 is a carbon-containing conductive adhesive having electrothermal properties that can assist in transmitting current to the conductive layer 30. The carbon-containing conductive adhesive is a metal-carbon mixture formed by mixing the conductive metal with the carbon-based materials. The conductive metal includes the silver, copper, gold or aluminum, and other high-conductivity metal materials. The carbon-based materials include graphite or carbon nanotubes. Furthermore, in the carbon-containing conductive adhesive, a volume percentage of the conductive metal is between 10% and 25% and a volume percentage of the carbon-based material is between 30% and 60%.

In this embodiment, the temperature control insulation layer 40 is disposed on the opposite side of the conductive layer 30 from the protective layer 10. At least one conductive wire 30A is electrically connected to the temperature control insulation layer 40. After the temperature control insulation layer 40 is electrified, when the conductive metal which is adjacent to the position of the conductive wire 30A receives electric current, due to the lower proportion of the conductive metal, the current will be initially passed only to the conductive layer 30, while the other conductive metals which do not receive the current will perform temperature maintenance effects with the carbon-based materials to prevent overheating. It should be noted that when the temperature control insulation layer 40 is placed between the conductive layer 30 and at least one of the conductive wires 30A, in addition to serving as a current transmission application, it can also effectively prevent oxidation of the conductive layer 30.

Furthermore, the temperature control insulation layer 40 may also include the various different conductive metals, such as the carbon-containing conductive adhesive made by mixing silver, nickel, and the carbon-based materials. It should be noted that since the carbon-containing conductive adhesive retains the properties of the carbon-based materials, even when the carbon-containing conductive adhesive is added with the high-conductivity metal materials, it can still maintain the temperature within the specific range, thereby preventing the occurrence of overheating in the vehicle lamp component B.

In this embodiment, the conductive layer 30 and the temperature control insulation layer 40 are sequentially bonded to the bonding layer 20 using the flexible 3D pattern element forming method. The flexible 3D pattern element forming method will be described in the following paragraphs.

The insulation layer 50 is a material with dielectric and high-temperature resistance properties. The insulation layer 50 is used as an enveloping structure and is enveloped on the bonding layer 20, the conductive layer 30, and/or the temperature control insulation layer 40 in the direction of the temperature control insulation layer 40 to form a multi-layer structure, to achieve isolation from the external environment, and to prevent the curved surface heating device from being affected by temperature and humidity, thereby increasing the stability of the bonding layer 20, the conductive layer 30, and the temperature control insulation layer 40.

Wherein, the pattern of the insulation layer 50 is not limited and can be a thin film layer that envelops the multi-layer structure of the bonding layer 20, the conductive layer 30, and/or the temperature control insulation layer 40 using methods such as coating, pad printing, reprinting, transfer printing, in-mold printing, 3D printing, inkjet printing, gravure printing, and the like. The insulation layer 50 may also be a shell that is bonded to the protective layer 10 through adhesive bonding or structural assembly.

Wherein, the insulation layer 50 may be a resin mixture commonly used as a protective adhesive, or may be made of plastic or glass; preferably, the insulation layer 50 is made of plastic materials such as polycarbonate (PC), polypropylene (PP), or polyethylene (PE).

Figure 3:
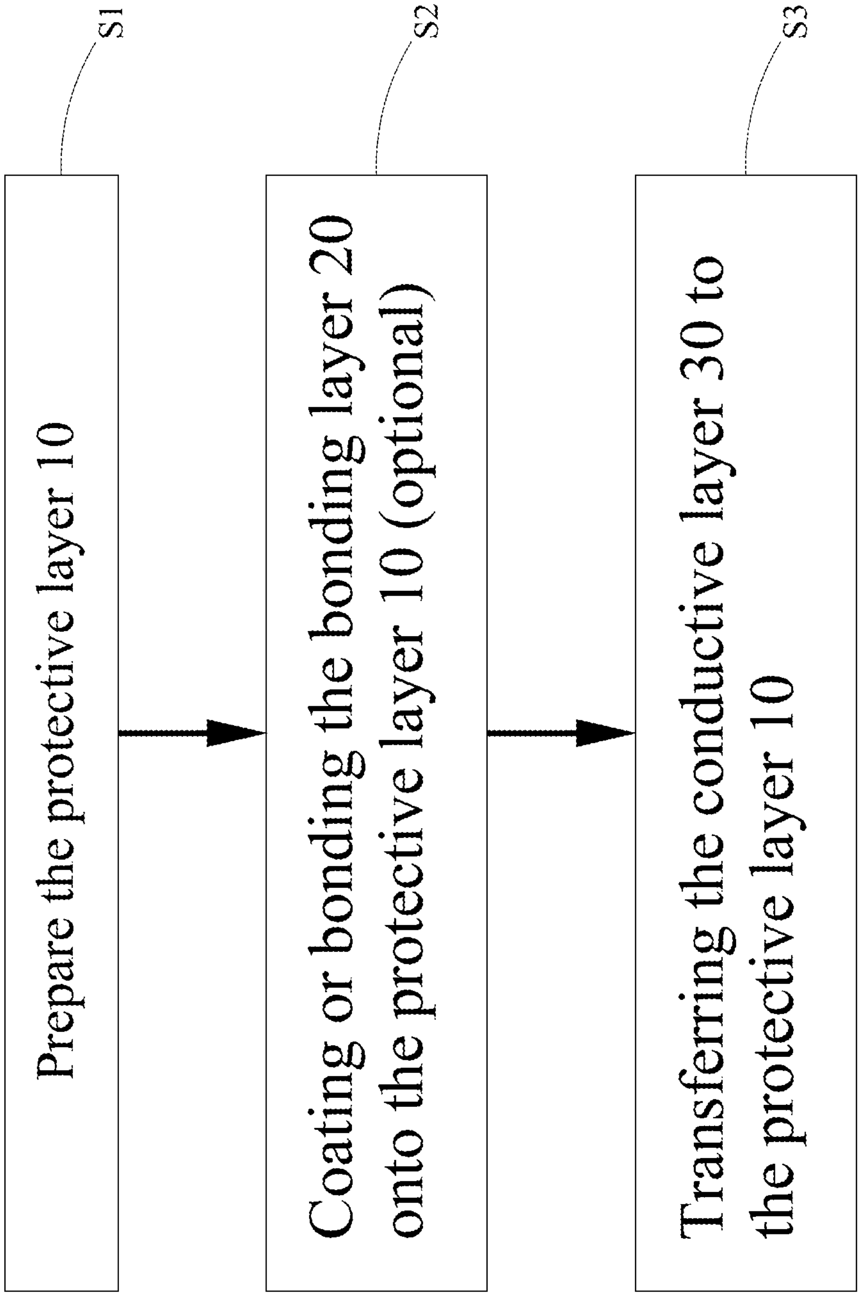
FIG. 3 is a first flow chart of the first preferred embodiment of the present invention.
Figure 4A:
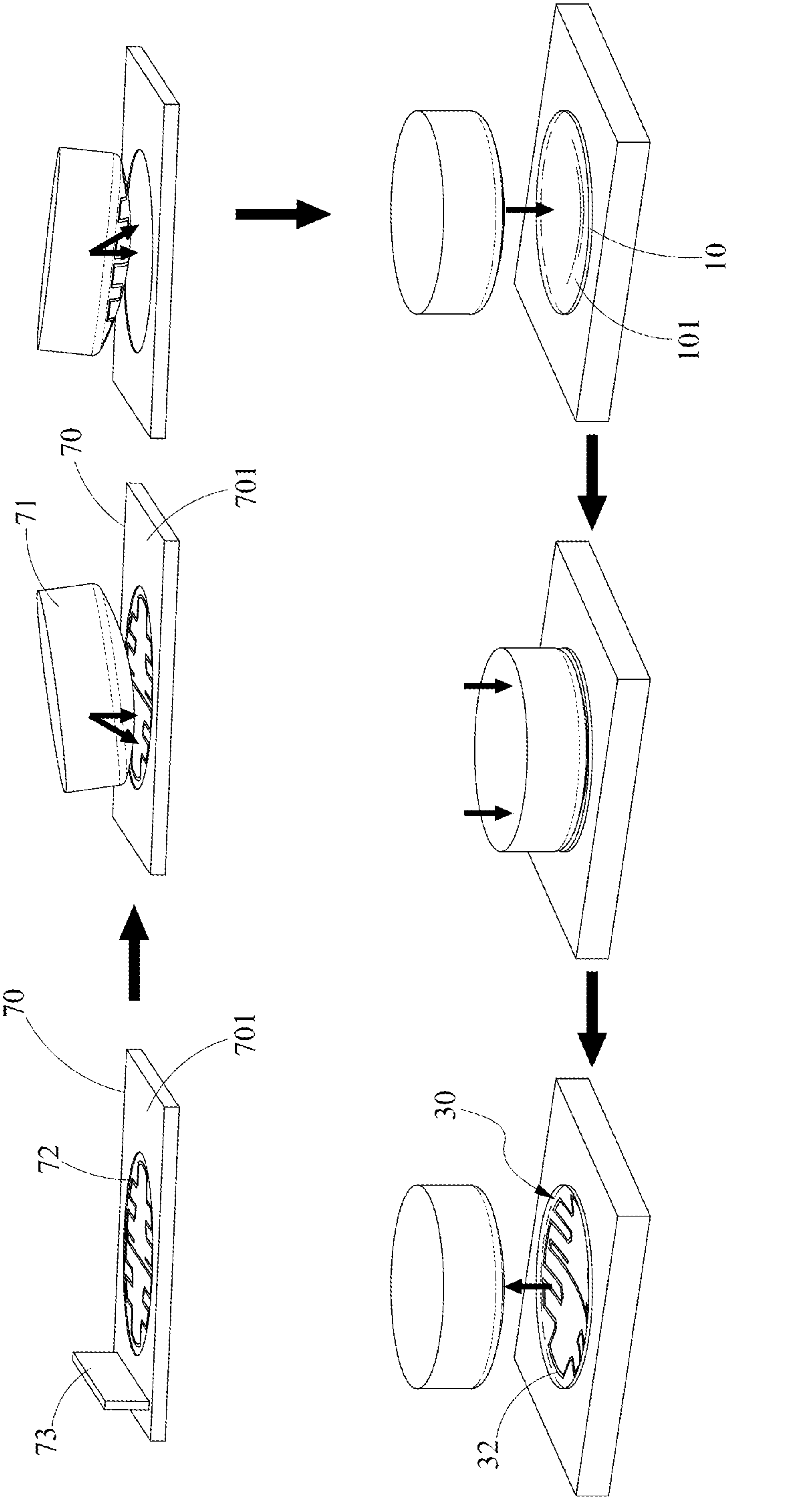
FIG. 4A is a second flow chart of the first preferred embodiment of the present invention.
Figure 4B:
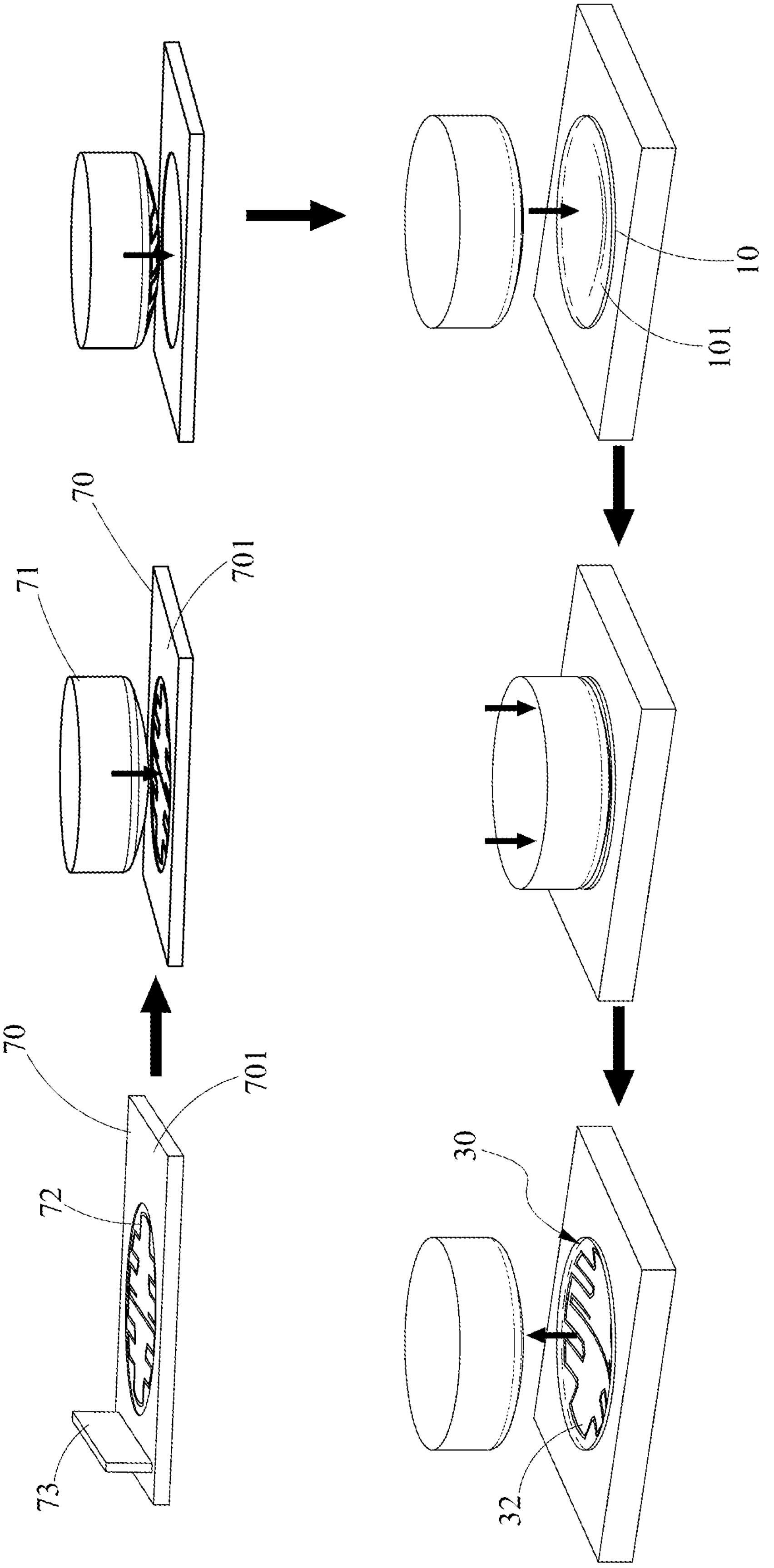
FIG. 4B is a third flow chart of the first preferred embodiment of the present invention.

Referring to FIGS. 3 and 4, the present invention further provides a method of manufacturing the flexible 3D pattern element to form the conductive layer 30 and/or the temperature control insulation layer 40 on the curved surface structure. The steps include:

Step S1: Preparing the protective layer 10. The protective layer 10 is the curved panel, which can be completed by any current process for forming a curved surface structure.

Step S2 (optional): Coating or bonding the bonding layer 20 onto the concave surface 101 of the protective layer 10.

Step S3: Transferring the conductive layer 30 to the concave surface 101 of the protective layer 10 or to the bonding layer 20. The detailed steps are described below using the protective layer 10 and the conductive layer 30 as examples:

Preparing a base 70 in advance and placing the conductive layer 30 on an upper surface 701 of the base 70. A carrier 71 is formed according to the shape of the curved surface of the protective layer 10. In this embodiment, the shape of the carrier 71 corresponds to the shape of the concave surface 101 of the protective layer 10.

Applying a pressure to the carrier 71 toward the upper surface 701 to cover the surface of the conductive layer 30 with the carrier 71, and at least a portion of the carrier 71 contacts the upper surface 701 of the base 70, so that the carrier 71 is attached to the conductive layer 30. Wherein the method by which the conductive layer 30 is attached to the carrier 71 is not limited, and the conductive layer 30 may be attached to the surface of the carrier 71 by the method of electrostatic adsorption, inherent tackiness of the conductive layer 30, or vacuum adsorption, etc.

Wherein, the carrier 71 is a block with elastic deformation properties, which facilitates the transfer of the conductive layer 30 to withstand pressure and helps the conductive layer 30 to adhere.

The carrier 71 then brings the conductive layer 30 against the concave surface 101 of the protective layer 10 so that when the carrier 71 leaves the concave surface 101 of the protective layer 10 again, the conductive layer 30 remains on the concave surface 101 of the protective layer 10 to complete the transfer step of the conductive layer 30.

Wherein, the upper surface 701 of the base 70 is concavely provided with a conductive recess 72, and the conductive layer 30 is placed in the conductive recess 72. The conductive layer 30 corresponds to the depth of the conductive recess 72 to form a conductive pattern 32 with a thickness, and at the same time, when attached to the carrier 71, a corresponding curved surface structure is formed.

Wherein, when the conductive layer 30 is the conductive adhesive, and the conductive adhesive is filled into the base 70, a scraper 73 is used to evenly distribute the conductive adhesive on the base 70 and scrape off the excess conductive adhesive. Thus, the conductive adhesive forms a three-dimensional and stable thickness.

Wherein, the conductive layer 30 can be mixed with the adhesive of the bonding layer 20 prior to being placed on the base 70 for performing the flexible 3D pattern element forming method.

Wherein, the conductive adhesive can be attached to the carrier 71 in a solidified or semi-solidified state, such that the conductive adhesive can maintain the conductive pattern 32 corresponding to the conductive recess 72 on the carrier 71.

It should be noted that the carrier 71 can correspond to the corresponding curvature of the vehicle lamp shell A, so that the carrier 71 can be applied to the vehicle lamp shells A with different curvatures. Preferably, the carrier 71 can also be applied to any workpieces with curvature, such as windshields of automobiles or motorcycles.

The application scope of the flexible 3D pattern element forming method provided by the present invention is wide, which can be used for various workpieces with different curvature, especially for the workpieces having larger curvature, and to achieve continuous printing effect, thereby enhancing process efficiency.

It should be noted that the flexible 3D pattern element forming method differs from conventional pad printing processes, which usually involve multiple steps such as platemaking, printing, and transfer printing, leading to complex procedures and high time costs, and the conventional pad printing processes can only be applied to thin films or paints. In contrast, in this method, the conductive layer 30 is first formed using the conductive adhesive corresponding to the base 70, and then the conductive layer 30 is attached to the concave surface 101 of the protective layer 10. With this method, a conductive layer 30 can be transfer printed with a thickness that is not possible with the conventional methods. If the conductive layer 30 does not reach the desired thickness, the curved surface heating device is susceptible to wear and may not provide the desired electrothermal effect in long-term use. In addition, when the conventional pad printing methods are applied to large-area structures, uneven ink deposition may occur and affect product quality.

The flexible 3D pattern element forming method provided by the present invention is not only suitable for workpieces with curvature, but also because the conductive adhesive is first poured into the base 70 during the manufacturing process, and then the material is evenly distributed within the base 70 by the scraper 72, so that the conductive adhesive can conform to the shape of the base 70 to form a 3D and stable pattern, solving the problems that may be encountered in conventional pad printing processing, and greatly improving the yield of the conductive layer 30.

Figure 5:
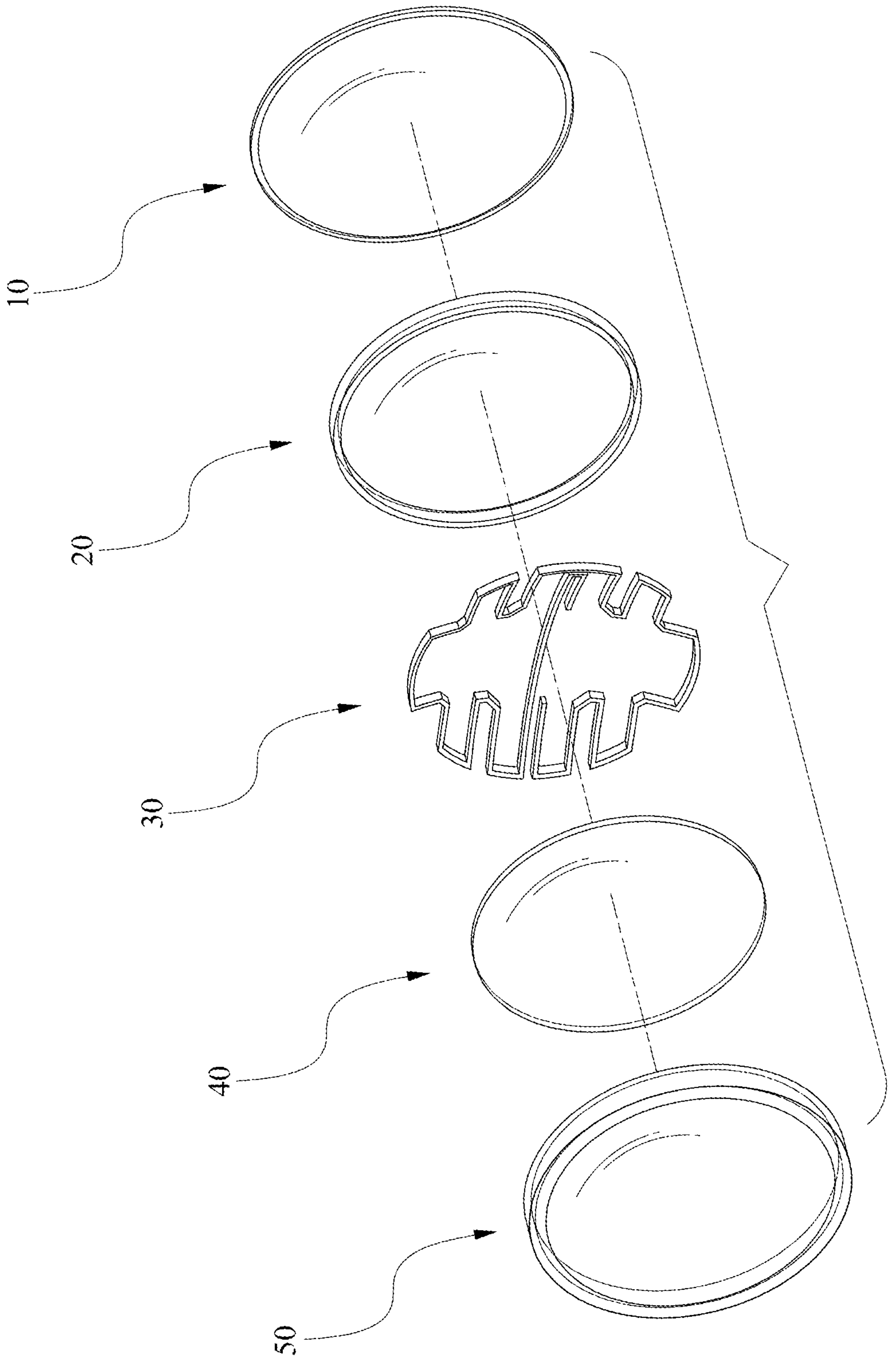
FIG. 5 is a perspective view of a second preferred embodiment of the present invention.

Referring to FIG. 5. The present invention further provides a second preferred embodiment of the curved surface heating device. The conductive layer 30 is distributed on the protective layer 10 in the form of linear conductive patterns 32. The conductive patterns 32 can be a type of mesh distribution, and such mesh distribution can ensure that when the electric current passes through, the electric current can flow uniformly and produce uniform heating effects throughout the conductive layer 30. Preferably, the spacing between adjacent lines of the linear conductive layer 30 can be adjusted according to the requirements of the application of the curved surface heating device so that the curved surface heating device can achieve different heating effects. For example, a smaller line spacing can provide higher conductivity so that the curved surface heating device can flow smoothly and transmit the electric current after being electrified. Wherein the preferred thickness of the conductive layer 30 is 10 micrometers (μm), which can provide an appropriate resistance value so that the electric current can effectively produce heating effects when passing through.

Wherein, the temperature control insulation layer 40 may also overlap with the conductive layer 30 in the form of the conductive pattern 32, without limitation.

Referring to FIG. 6. The present invention further provides a third preferred embodiment of the curved surface heating device. At least one conductive wire 30A can be added between the conductive layer 30 and the temperature control insulation layer 40, so that the electric current can flow to the conductive layer 30 to produce heating effects. Preferably, the conductive wire 30A is a material having dielectric and flexibility.

Furthermore, this embodiment includes two conductive wires 30A, each of which includes two electrode points 30B and two fixing members 30C. The two conductive wires 30A are connected and fixed to the conductive layer 30 via the two electrode points 30B. The method of fixing the two electrode points 30B to the conductive layer 30 may include fixing elements, such as low-temperature solder paste or fixed terminal blocks, to reduce the effect on the conductivity of the conductive layer 30. Preferably, the conductive wire 30A can be tightly connected to the conductive layer 30 by direct pressure or by using temperature melting, for example, by using a conductive double-sided adhesive to directly attach the conductive wire 30A to the conductive layer 30. By the adhesive properties of the conductive double-sided adhesive, the conductive wire 30A is firmly fixed to the conductive layer 30, thereby preventing the conductive wire 30A from falling off due to shaking or vibration during driving of the vehicle, thereby improving the usability of the conductive wire 30A. At the same time, by directly fixing the conductive wire 30A to the conductive layer 30, a situation in which the electrode surface printing layer falls off due to repeated switching of the vehicle lamp components B after the vehicle lamp component B is activated, resulting in an unstable power supply or an inability to supply power, can also be avoided.

It should be noted that the two conductive wires 30 may be a flexible circuit board having the characteristics of small volume, easy connection, wear resistance, and high precision, and because of strong flexibility, the flexible circuit board can be widely used, such as in the vehicle lamp shell A, and can be well fitted with the vehicle lamp shell A; preferably, the flexible circuit board includes flexible flat cables (FFC) and flexible printed circuits (FPC).

The two fixing members 30C are respectively located at one end of the two opposite electrode points 30B, and the two conductive wires 30A are fixed to a substrate by the two fixing members 30C so that the two conductive wires 30A are free from shaking or vibration to cause loosening during driving of the vehicle; wherein the two fixing members 30C include conductive double-sided adhesive, low-temperature solder paste, or fixed terminal blocks and other fixing elements having fixing effects.

Wherein, the substrate may include a circuit board, which is connected to the power supply device, when the two conductive wires 30A are fixed to the circuit board by the two fixing members 30C and connected to the power supply device via the circuit board, the electric current flows from the power supply device to the conductive wires 30A, then flows into the conductive layer 30 through the conductive wires 30A, and finally achieves heating and temperature rise through the conductive layer 30.

Preferably, the two conductive wires 30A can be disposed to extend from the edge of the vehicle lamp shell A toward the vehicle lamp component B and then fixed to the substrate by the two fixing members 30C.

It is worth mentioning that the two ends of the linear conductive layer 30 are not directly connected, but are connected to the two electrode points 30B, respectively, forming a unidirectional current loop. When the power supply device is activated, the current is sequentially transmitted from the circuit board to the fixing member 30C, then to the electrode point 30B on the conductive wire 30A, and finally to the conductive layer 30 through the conductive wire 30A; since the conductive layer 30 is evenly distributed in a linear shape on the protective layer 10 and the bonding layer 20 and is connected in the unidirectional current loop, the conductive layer 30 can generate uniform heating effects after being electrified, thereby preventing local overheating or uneven heating of the conductive layer 30.

Referring to FIGS. 7 and 8 and FIGS. 5 and 6, a third preferred embodiment of the present invention is shown. In order to clearly illustrate the practical effects and achievements of this embodiment, FIGS. 5 and 6 only describe the combination relationship of the protective layer 10, the conductive layer 30, the conductive wire 30A, the electrode point 30B, and the fixing member 30C as a schematic representation. Any combination method that can achieve the same effect and purpose of the curved surface heating device is covered in this specification.

The method in which the two conductive wires 30A are connected to the conductive layer 30 via the two electrode points 30B includes, but is not limited to, fixing the two conductive wires 30A to the center of the conductive layer 30 in the protective layer 10 via the two electrode points 30B; for example, the two conductive wires 30A may also be fixed to the periphery of the conductive layer 30 in the protective layer 10 via the two electrode points 30B. In this way, when the two conductive wires 30A are installed in workpieces having complex internal structures, the two conductive wires 30A are tightly attached and installed along the internal structure of the workpiece in the same direction, which reduces the impact of the two conductive wires 30A on other components inside the workpiece.

When the curved surface heating device is applied to the vehicle lamp shell A, the edge of the protective layer 10 extends with a fastening structure 11 to be fastened with a lamp holder 60. When the vehicle lamp component B is electrified and emits light, the light emitted from the vehicle lamp component B passes through the vehicle lamp shell A.

The curved surface heating device and its manufacturing method provided by the present invention use the flexible 3D pattern element forming method to produce workpieces with curved and deformable surfaces, which can be widely used in various materials and products, especially for workpieces with larger curvatures, surfaces, or continuous printing requirements for adhesives, coatings, etc. Furthermore, with the properties of the temperature control insulation layer 40 material, the curved surface heating device has the effect of temperature control and temperature maintenance, reducing the occurrence of uneven heating of the curved surface heating device. At the same time, by directly fixing the two conductive wires 30A to the conductive layer 30, the repeated switching impact on the vehicle lamp components after the vehicle lamp component is activated can be reduced, so that the electrode surface printing layer is less likely to fall off or become detached, thereby increasing the service life of the curved surface heating device.

What is claimed is:

1. A curved surface heating device, comprising:

a protective layer having a curved panel shape and dielectric properties;

a conductive layer formed on one side of the protective layer and having electrothermal properties, with a resistance value within 300Ω and a current withstand value of less than 20 A;

the conductive layer comprising a high-conductivity material including a conductive metal or a carbon-based material, wherein a volume percentage of the conductive metal in the high-conductivity material is between 30% and 60%, and a volume percentage of the carbon-based material in the high-conductivity material is between 30% and 60%, and a thickness of the conductive layer is within 50 micrometers (μm);

a temperature control insulation layer on one side of the conductive layer opposite to the protective layer and comprising the carbon-based material in a volume percentage between 30% and 60%, and the conductive metal, with a volume percentage between 10% and 25%; and at least one conductive wire electrically connected to the temperature control insulation layer;

wherein the at least one conductive wire maintains a temperature between 30° C. and 100° C., and the conductive metal of the temperature control insulation layer receives an electric current from the at least one conductive wire and transmits the current to the conductive layer.

2. The curved surface heating device according to claim 1, wherein the conductive layer is formed on a concave surface of the protective layer.

3. The curved surface heating device according to claim 1, wherein the protective layer is a plastic curved panel shape or a glass curved panel shape.

4. The curved surface heating device according to claim 3, wherein the conductive layer comprises a conductive pattern.

5. The curved surface heating device according to claim 1, wherein the conductive metal and/or the carbon-based material of the conductive layer is granular, flaky, or in the form of short fibers.

6. The curved surface heating device according to claim 5, wherein the transmittance of the conductive layer is over 80%.

7. The curved surface heating device according to claim 6, wherein a bonding layer is disposed between the protective layer and the conductive layer, and the bonding layer has dielectric properties and an area slightly larger than that of the conductive layer, and the bonding layer is a film or an adhesive, wherein at least a portion of the bonding layer is in contact with the periphery of one side of the conductive layer in the thickness direction.

8. The curved surface heating device according to claim 7, wherein the bonding layer and the conductive layer jointly form a plane.

9. The curved surface heating device according to claim 6, further comprising an insulation layer bonded to the protective layer, the insulation layer comprising an enveloping structure enveloping the bonding layer, the conductive layer, and the temperature control insulation layer, having dielectric properties and high temperature resistance, wherein the insulation layer is a film, a shell, or a curing adhesive.

10. A method of forming the curved surface heating device of claim 1, comprising the steps of:

preparing the protective layer;

providing a carrier, wherein the curved panel shape of the protective layer corresponds to a shape of the carrier;

placing the conductive layer on an upper surface of a base;

applying pressure to the carrier toward the upper surface so that the carrier covers the conductive layer and at least a portion of the carrier contacts the upper surface of the base;

attaching the conductive layer to the carrier;

positioning the conductive layer with the carrier against the protective layer and leaving the conductive layer on one side of the protective layer; and placing the temperature control insulation layer on one side of the conductive layer opposite to the protective layer.

11. The method of claim 10, wherein the upper surface of the base is concavely provided with a conductive recess, and the conductive layer is placed in the conductive recess to form a conductive pattern with a thickness corresponding to the depth of the conductive recess.

12. The method of claim 10, wherein the conductive layer is a conductive adhesive material, and is attached to the carrier in a solidified or a semi-solidified state.

13. The method of claim 11, wherein the carrier is a block with elastic deformation properties.

14. The method of claim 12, wherein the conductive layer is attached to the surface of the carrier by the method of electrostatic adsorption, inherent tackiness of the conductive layer, or vacuum adsorption.

15. The method of claim 13, wherein one side of the protective layer is first provided with a bonding layer before being bonded to the conductive layer.

16. The method of claim 13, wherein the protective layer is first mixed with a bonding layer before being placed on the base.

17. The method of claim 13, wherein the one side is a concave surface of the protective layer.

* * * * *